US010597319B2

(12) United States Patent
Pardo et al.

(10) Patent No.: US 10,597,319 B2
(45) Date of Patent: Mar. 24, 2020

(54) METHOD FOR MANAGING AIR STREAMS FROM MECHANICAL DEHYDRATION OF SLUDGE, AND CORRESPONDING DEVICE

(71) Applicant: SUEZ INTERNATIONAL, Paris la Defense (FR)

(72) Inventors: Pierre Emmanuel Pardo, Orsay (FR); Valerie Nastasi, Villejust (FR); Eric Judenne, Chaville (FR)

(73) Assignee: SUEZ INTERNATIONAL, Paris la Defense (FR)

( * ) Notice: Subject to any disclaimer, the term of this patent is extended or adjusted under 35 U.S.C. 154(b) by 309 days.

(21) Appl. No.: 15/527,661

(22) PCT Filed: Feb. 1, 2016

(86) PCT No.: PCT/IB2016/050500
§ 371 (c)(1),
(2) Date: May 17, 2017

(87) PCT Pub. No.: WO2016/125069
PCT Pub. Date: Aug. 11, 2016

(65) Prior Publication Data
US 2018/0334403 A1 Nov. 22, 2018

(30) Foreign Application Priority Data
Feb. 2, 2015 (FR) ..................... 15 50785

(51) Int. Cl.
*B01D 19/00* (2006.01)
*C02F 11/122* (2019.01)
(Continued)

(52) U.S. Cl.
CPC .............. *C02F 11/122* (2013.01); *B30B 9/04* (2013.01); *B30B 9/047* (2013.01); *B30B 9/06* (2013.01);
(Continued)

(58) Field of Classification Search
CPC ......... C02F 11/122; B30B 9/06; B30B 15/00; B30B 9/047; B30B 9/262; B30B 9/04;
(Continued)

(56) References Cited

U.S. PATENT DOCUMENTS 4,525,156 A * 6/1985 Benusa ............... A61M 1/0058
604/28
4,573,974 A * 3/1986 Ruschke ............. A61M 5/1408
137/113
(Continued)

FOREIGN PATENT DOCUMENTS

BE        635 799 A     12/1963
FR      1 484 558 A      6/1967
(Continued)

OTHER PUBLICATIONS

International Search Report, dated Apr. 15, 2016, from corresponding PCT application.
(Continued)

Primary Examiner — Dung H Bui
(74) Attorney, Agent, or Firm — Young & Thompson

(57) ABSTRACT

Disclosed is a piston press of the type used in the field of the dehydration of products to be dehydrated such as sludge from a purification plant. More particularly, it relates to a piston press including a pressing chamber supplied with sludge and able to manage air streams that it generates, and to a method for using such a press. In a preferred mode of embodiment, the piston press includes a pipeline having a water removal branch and arranged so as to remove water extracted during a sludge-pressing operation, and an air circulation branch that can channel the volumes of air circulating in the press during the operation thereof, so as to direct the vitiated air, i.e. air that has been brought into
(Continued)

contact with the sludge during the implementation of the press, towards a deodorization system.

20 Claims, 2 Drawing Sheets

(51) Int. Cl.
    *B30B 9/26*         (2006.01)
    *F26B 5/14*         (2006.01)
    *B30B 9/04*         (2006.01)
    *B30B 9/06*         (2006.01)
    *B30B 15/00*       (2006.01)
    *B01D 53/14*       (2006.01)

(52) U.S. Cl.
    CPC .............. *B30B 9/262* (2013.01); *B30B 15/00* (2013.01); *F26B 5/14* (2013.01); *B01D 19/0036* (2013.01); *B01D 19/0042* (2013.01); *B01D 19/0057* (2013.01); *B01D 19/0063* (2013.01); *B01D 53/1425* (2013.01); *F26B 2200/18* (2013.01)

(58) Field of Classification Search
    CPC .... F26B 5/14; F26B 2200/18; B01D 19/0036; B01D 53/1425; B01D 19/0057; B01D 19/0063; B01D 19/0042
    See application file for complete search history.

(56) References Cited

U.S. PATENT DOCUMENTS

| | | | | |
|---|---|---|---|---|
| 5,002,528 | A * | 3/1991 | Palestrant | A61M 3/0241 604/246 |
| 5,127,904 | A * | 7/1992 | Loo | A61M 39/02 137/533 |
| 5,584,808 | A * | 12/1996 | Healy | A61M 39/045 604/249 |
| 5,807,312 | A * | 9/1998 | Dzwonkiewicz | A61M 5/1424 604/248 |
| 5,871,478 | A * | 2/1999 | Berrigan | A61M 5/1428 128/DIG. 12 |
| 6,981,967 | B2 * | 1/2006 | Massengale | A61M 5/1424 604/174 |
| 7,998,106 | B2 * | 8/2011 | Thorne, Jr. | A61J 1/2096 604/32 |
| 8,425,780 | B2 * | 4/2013 | Beiriger | A61M 1/1607 210/120 |
| 2006/0159552 | A1 * | 7/2006 | Tessien | B01D 19/0036 417/53 |
| 2006/0213563 | A1 * | 9/2006 | Peppel | A61M 39/02 137/605 |
| 2006/0273000 | A1 * | 12/2006 | Chung | B01D 35/26 210/416.1 |
| 2009/0198217 | A1 * | 8/2009 | Thorne, Jr. | A61J 1/2096 604/518 |
| 2010/0087716 | A1 * | 4/2010 | Nashed | A61B 5/14503 600/309 |
| 2012/0041416 | A1 * | 2/2012 | Lal | A61M 5/14 604/506 |
| 2014/0013947 | A1 * | 1/2014 | Liu | B01D 19/0036 95/248 |
| 2014/0251141 | A1 * | 9/2014 | Hoogenakker | B01D 19/0063 95/266 |
| 2014/0271252 | A1 * | 9/2014 | Vines | F04B 49/22 417/53 |
| 2015/0047501 | A1 * | 2/2015 | Vines | F04B 53/06 95/19 |
| 2015/0096441 | A1 * | 4/2015 | Iseki | B01D 19/0063 95/259 |
| 2016/0115064 | A1 | 4/2016 | Faccioli | |
| 2016/0287780 | A1 * | 10/2016 | Lee | A61M 5/172 |
| 2017/0043305 | A1 * | 2/2017 | Igarashi | B01D 19/00 |

FOREIGN PATENT DOCUMENTS

| | | |
|---|---|---|
| FR | 3 005 950 A1 | 11/2014 |
| GB | 996 717 A | 6/1965 |
| WO | 00/71222 A2 | 11/2000 |

OTHER PUBLICATIONS

French Search Report, dated Jul. 16, 2015, from corresponding FR application.

* cited by examiner

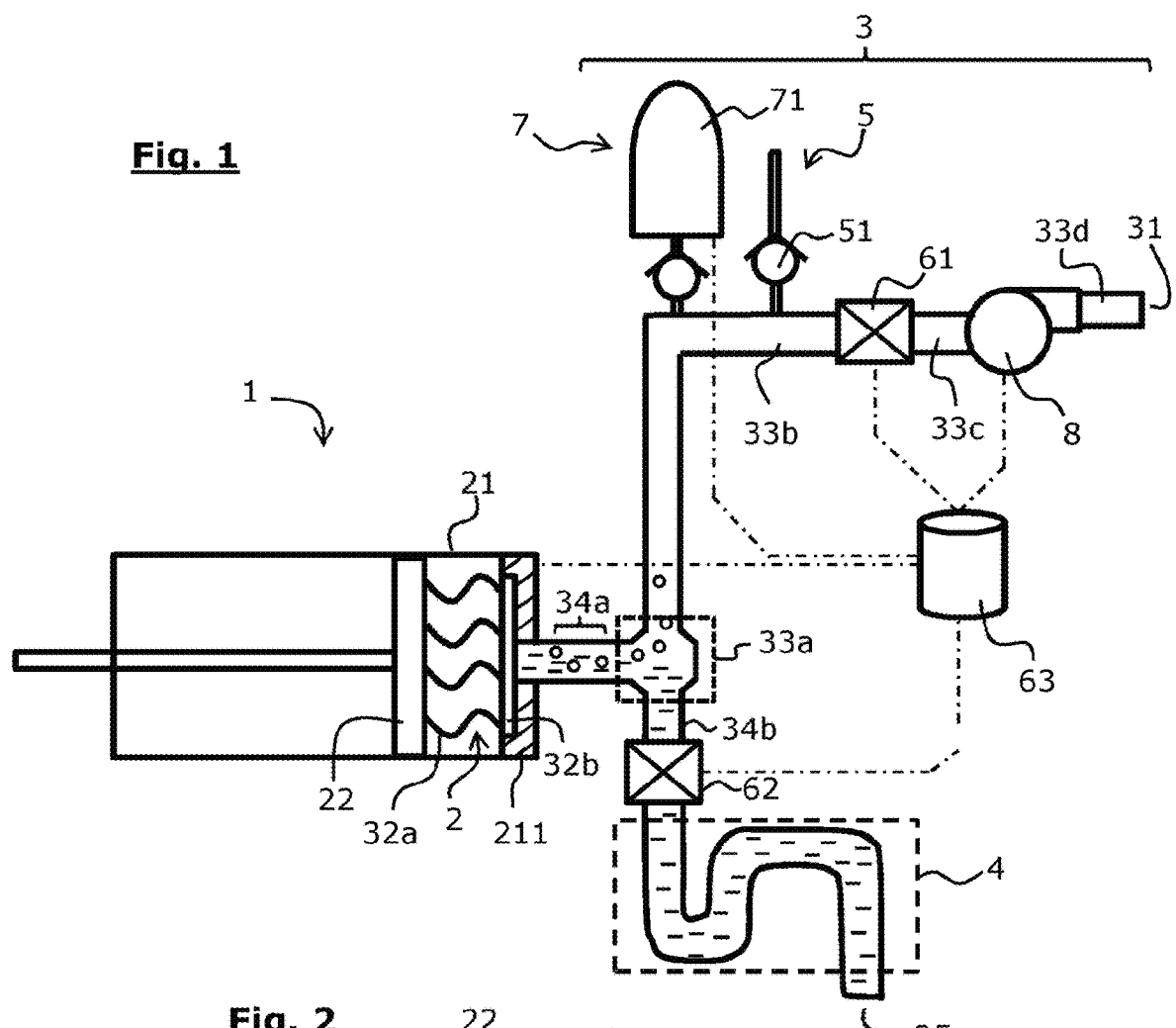
Fig. 1
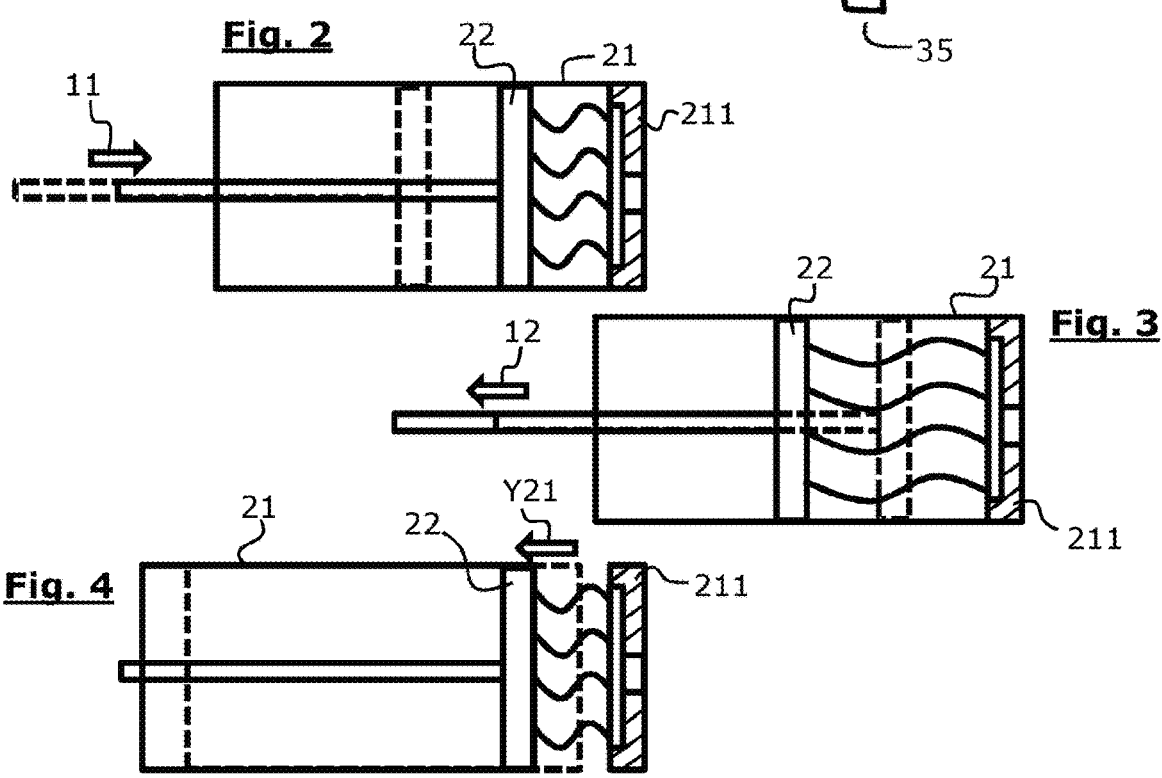
Fig. 2
Fig. 3
Fig. 4

METHOD FOR MANAGING AIR STREAMS FROM MECHANICAL DEHYDRATION OF SLUDGE, AND CORRESPONDING DEVICE

TECHNICAL FIELD

The present invention relates to the field of the dewatering of pasty products, also referred to in this document as "products to be dewatered", in particular treatment plant sludge.

The present invention relates more particularly to a piston press suitable for managing airflows that it generates, and also to a process for using such a press.

PRIOR ART

A mechanical dewatering process known as "Dehydris™ Twist" is known in the prior art that makes it possible to dewater drinking water and wastewater treatment plant sludge or desalination plant sludge.

Such a process uses a piston press comprising a cylinder and a piston that form a chamber in which the products to be dewatered are pressed when the piston approaches the end of the cylinder. In this pressing chamber, the piston and the end of the cylinder are advantageously connected by flexible drains that are permeable to the liquid and impermeable to the solid materials. Such a piston press makes it possible to carry out cycles for dewatering products introduced into the pressing chamber. Typically, a dewatering cycle comprises:
- at least one supply operation that makes it possible to introduce a product to be dewatered into the pressing chamber,
- at least one pressing operation that makes it possible to extract from the product to be dewatered a portion of the water that it contains, this portion of water, referred to as filtrate, being discharged from the pressing chamber through the drains,
- at least one emptying operation that makes it possible to discharge the product to be dewatered from the pressing chamber through opening the cylinder.

One drawback of such a process is that it generates odors originating from the handling of the product to be dewatered which is brought into contact with streams of air that may circulate in the environment of the piston press or in premises housing this press. In the case of treatment plant sludge, such odors may be harmful to the health of individuals who are in such an environment or such premises.

Indeed, on the one hand, the correct operation of such a press involves enabling the pressing chamber to be:
- supplied with outside air when, under the effect of the displacement of the piston or of the discharging of filtrate, the volume of the pressing chamber not filled with the product to be dewatered increases,
- emptied of some of the air that it contains when, under the effect of the displacement of the piston or of the supplying with product to be dewatered, the volume of the pressing chamber not filled by the product to be dewatered decreases.

This is made possible, in the known prior art, by a vent or orifice that allows a natural circulation of air between the pressing chamber and the outside of the piston press.

The natural circulation of air through such a vent or orifice disadvantageously results in an emanation of odors during the activation of the piston, in particular during a pressing operation during which the air released may be malodorous and/or contain pollutants emitted by the product to be dewatered.

Moreover, during the emptying operation, the cylinder is open opening the space inside the pressing chamber to the outside of the press and thus generating odors in the ambient air around the press.

In these two cases, reducing the propagation of the odors may be carried out by a dedicated suction system, for example located on the ceiling of the room housing the piston press. Such a suction system typically operates by diluting the contaminated air and requires a greater volume of air, the greater the emissions. In general, this volume of contaminated air is then treated (deodorization).

Another drawback of such a process is that the product to be dewatered clogs the drains of the press.

The objective of the present invention is to overcome all or some of these drawbacks and/or to reduce the flows of ventilation air to be discharged and deodorized and/or to optimize the management of the treatment of the odors from a piston press and/or to minimize the clogging of the drains.

SUMMARY OF THE INVENTION

For this purpose, the present invention proposes a piston press comprising a pressing chamber, the pressing chamber being formed by a cylinder and a piston, this piston press being arranged in order to carry out at least one pressing operation, this pressing operation comprising:
- at least one displacement of the piston in a first direction that reduces the volume of the pressing chamber,
- at least one displacement of the piston in a second direction, different from the first direction and preferably opposite to the first direction, that increases the volume of the pressing chamber.

According to a first aspect of the press according to the invention, this piston press preferably comprises a pipe connecting the pressing chamber to an air outlet of this pipe, this pipe being arranged so that air circulating in the pipe between the pressing chamber and said air outlet is displaced:
- from the pressing chamber to the air outlet of the pipe when the piston is displaced in the first direction,
- to the pressing chamber when the piston is displaced in the second direction, the pipe comprising:
- at least one mixed part arranged to move air and water originating from the pressing chamber,
- a bifurcation arranged in order to separate the air and the water moved through the at least one mixed part, the mixed part of the pipe being located between the bifurcation and the pressing chamber.

Such a pipe improves the channeling of the odors generated by such a piston press, especially during the pressing operation, in particular when the pressing chamber comprises a product to be dewatered of wastewater sludge type.

According to one advantageous feature, the pipe may additionally comprise:
- an air circulation branch connecting the bifurcation and the air outlet,
- a water discharge branch connecting the bifurcation and a water outlet of this water discharge branch.

According to another advantageous feature, the piston press according to the invention may additionally comprise hydraulic means, preferably a siphon, arranged in order to prevent circulation of air, in the water discharge branch, through these hydraulic means.

According to yet another advantageous feature, the piston press according to the invention may additionally comprise air introduction means, preferably located in the air circulation branch, that are arranged in order to introduce, into the pipe, air originating from outside the pressing chamber.

Preferably, the air introduction means comprise a non-return valve.

Advantageously, the piston press according to the invention may additionally comprise closure means for closing the pipe that are arranged in order to prevent any circulation of air or water in the pipe through these closure means. Preferably, these closure means comprise an airtight valve, or respectively a watertight valve, when such a valve is placed in the closed state, and allow air, or respectively water, through when it is placed in an open state, such a valve being mounted in the air circulation branch or respectively water discharge branch.

Such closure means make it possible to control the circulation of air or water, and to thus improve the channeling of the odors generated by such a piston press, for example during the pressing operation.

Preferably, the piston press according to the invention additionally comprises control means suitable for governing the closure means of the pipe.

According to another advantageous feature, the piston press according to the invention may additionally comprise ventilation means of fan type, located in the air circulation branch, suitable for generating an airflow from the pressing chamber to the air outlet of the pipe.

According to yet another feature, the bifurcation may be arranged in order to discharge the water to the water discharge branch by the effect of gravity on the water so as to separate the water and the air.

According to a second aspect of the press according to the invention, the piston press according to the invention may additionally comprise an air injection system comprising a compressed air tank, this injection system preferably being arranged in order to inject a (preferably calibrated) volume of compressed air into a pipe toward the pressing chamber, this pipe preferably corresponding to the pipe according to the first aspect of the invention.

In particular, this air injection system may be located in the air circulation branch of a press according to the first aspect of the invention.

Preferably, the air injection system is suitable for injecting the compressed air into the pipe quickly, so as to inject said volume into the pipe typically in less than two seconds.

Such an air injection system makes it possible in particular to unclog the parts of the press in contact with the product to be dewatered and to thus promote the air suction.

The invention also relates to a process for using a piston press according to various combinations of features described above, the piston press carrying out at least one pressing operation, this pressing operation comprising:

- at least one step of displacing the piston in the first direction that reduces the volume of the pressing chamber,
- at least one step of displacing the piston in the second direction that increases the volume of the pressing chamber.

According to a first aspect of the process according to the invention, the process preferably comprises at least one step of circulating air in the pipe between the pressing chamber and the air outlet during which the air is displaced:

from the pressing chamber to the air outlet of the pipe when the piston is displaced in the first direction,
to the pressing chamber when the piston is displaced in the second direction, and, preferably, it additionally comprises:

at least one step of circulating air and water originating from the pressing chamber to at least one mixed part of the pipe,
at least one step of separating the air and the water moved through the at least one mixed part.

Advantageously, the process according to the invention may additionally comprise at least one step of introducing, into the pipe, air originating from outside the pressing chamber.

According to one advantageous feature, the process according to the invention may additionally comprise at least one step of closing the pipe preventing any circulation of air or water in the pipe through the closure means of a piston press according to various combinations of features described above. Typically, in order to carry out such a closure step, a valve mounted on the air circulation branch or respectively water discharge branch, is governed.

According to another advantageous feature, the process according to the invention may additionally comprise at least one step of generating an airflow that displaces air in the pipe from the pressing chamber to the air outlet, for example with the aid of ventilation means.

Preferably, the generating step comprises a step of generating an airflow produced while the piston is displaced in the first direction.

Very advantageously, the at least one generating step may comprise a step of generating an airflow, preferably with a maximum flow rate of the ventilation means, produced during at least one emptying operation, the at least one emptying operation making it possible to discharge, from the pressing chamber, a product to be dewatered that has undergone the at least one pressing operation. Thus, the invention also makes it possible to improve the channeling of the odors generated by a piston press according to the invention during the emptying operation.

According to yet another advantageous feature, the flow of air is preferably transported by the ventilation means and is controlled so as to achieve a flow calculated as a function of an estimated dewatering percentage of a product to be dewatered that is in the pressing chamber.

According to a second aspect of the process according to the invention, the process according to the invention may comprise at least one step of injecting a volume of compressed air into a pipe toward the pressing chamber, this pipe preferably corresponding to the pipe according to the first aspect of the invention. Typically, this injection step is carried out with the injection system described above. Such an injection step makes it possible in particular to unclog the parts of the press in contact with the product to be dewatered and to thus promote the air suction.

Preferably, the calibrated volume of compressed air is calculated as a function of an estimated volume of a product to be dewatered that is in the pressing chamber and of a set dewatering percentage of said product to be dewatered.

Preferably, the at least one injection step comprises an injection step carried out after the at least one pressing operation and that precedes at least one emptying operation, which makes it possible to limit the bonding phenomena during the at least one emptying operation, the at least one emptying operation making it possible to discharge from the pressing chamber a product to be dewatered that has undergone the at least one pressing operation.

Advantageously, the at least one injection step may comprise an injection step carried out before the end of the at least one pressing operation, which makes it possible in particular to improve the final dryness of the product to be dewatered by deconstructing it.

According to one advantageous feature, the at least one closure step may be carried out before the at least one injection step.

DESCRIPTION OF THE FIGURES AND EMBODIMENTS

Other advantages and distinctive features of the invention will appear on reading the detailed description of implementations and embodiments that are in no way limiting, and the following appended drawings:

FIG. 1 is a schematic view of a piston press according to the invention;

FIGS. 2-4 represent a part of the piston press from FIG. 1 in various operating states of a cylinder and of a piston of this press:

Figure 5:
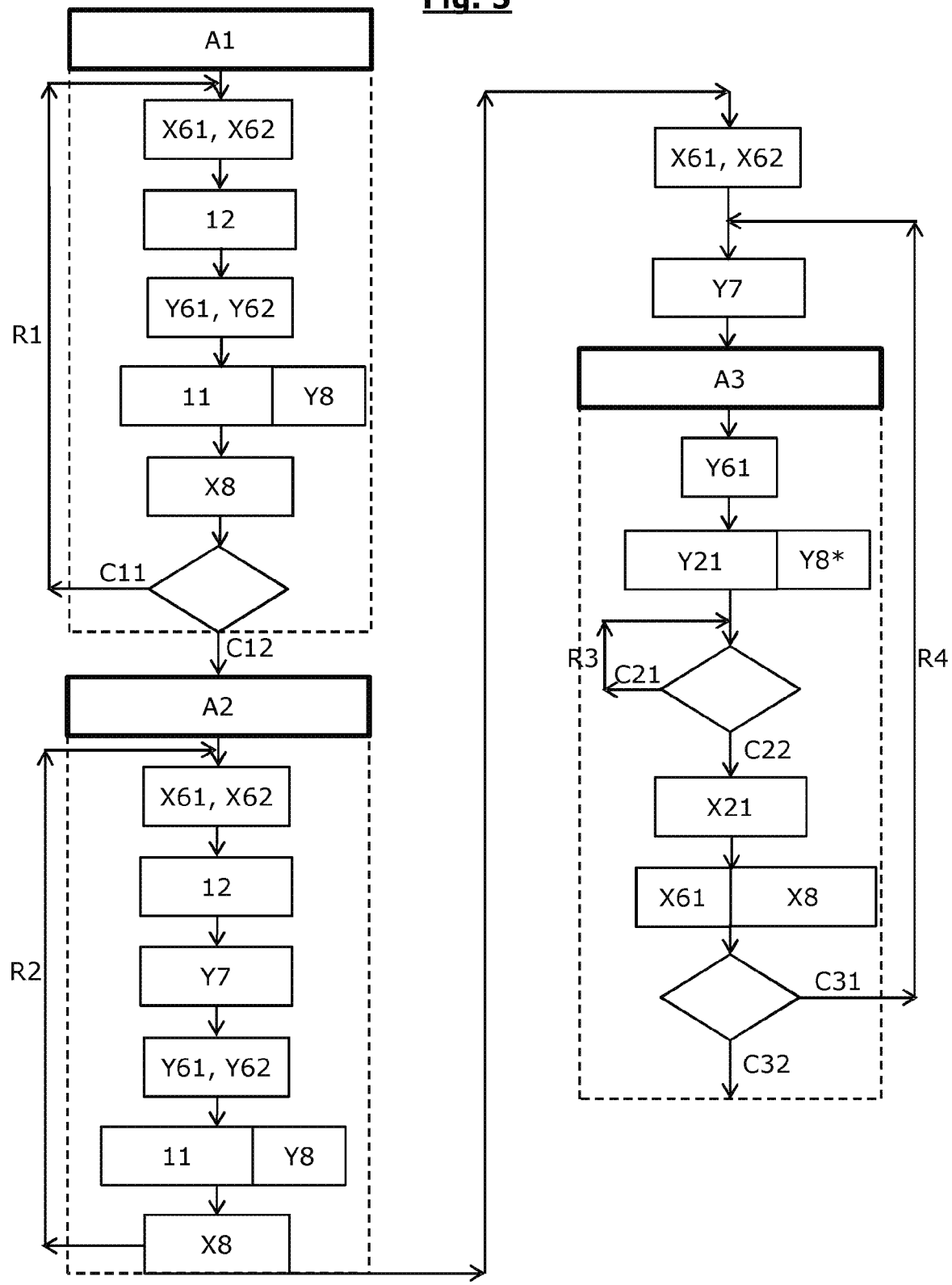

FIG. 2: displacement of the piston in a first direction that reduces the volume of a pressing chamber formed by the cylinder and the piston, FIG. 3: displacement of the piston in a second direction that increases the volume of the pressing chamber, FIG. 4: opening the cylinder in order to carry out an emptying operation;

FIG. 5 illustrates a usage process that uses the piston press from FIG. 1.

Since the embodiments described below are in no way limiting, variants of the invention could in particular be considered that comprise only a selection of features described, singled out from the other features described (even if this selection is singled out within a sentence comprising these other features), if this selection of features is sufficient to confer a technical advantage or to differentiate the invention with respect to the prior art. This selection comprises at least one feature, preferably a functional feature without structural details, or with only a portion of the structural details if this portion alone is sufficient to confer a technical advantage or to differentiate the invention with respect to the prior art.

FIG. 1 illustrates a currently preferred embodiment of the piston press according to the invention.

According to this embodiment, the piston press 1 comprises a cylinder 21 and a piston 22 that form a pressing chamber 2.

The volume of the pressing chamber 2 may vary depending on the position of the piston 22 with respect to the cylinder 21. For example, when the piston 22 is displaced in a first direction 11, represented from the left to the right in FIG. 2, the volume of the pressing chamber 2 decreases. When the piston 22 is displaced in a second direction 12, in particular opposite to the first direction and represented from the right to the left in FIG. 3, the volume of the pressing chamber 2 increases.

The piston press 1 according to the invention comprises a pipe 3 connecting the pressing chamber 2 to an air outlet 31.

When the press 1 is housed in premises or a building (delimited by walls and doors), this air outlet 31 opens outside of said premises or building also housing potential users.

In this embodiment, the pipe 3 comprises:
- drains 32a (or sheaths) connecting the piston 22 and one end of the cylinder 211 represented in cross section in FIGS. 1 to 4,
- a recovery chamber 32b made in one end of the cylinder 211.

The drains 32a are supple or flexible, in order to withstand the displacements of the piston 22 in the first direction 11 or the second direction 12, the end of the cylinder 211 being fixed relative to the cylinder 21. Advantageously, the drains 32a are of a type that is permeable to liquids and gases and impermeable to solid materials. Thus, water or air can circulate through these drains 32a.

The recovery chamber 32b is connected to a pipe element referred to as mixed part 34a.

The recovery chamber 32b and the mixed part 34a of the pipe 3 are arranged so that, when the piston press 1 carries out a pressing operation A2 during which the piston 22 is successively displaced in the first direction 11 and the second direction 12, the water and the air originating from the pressing chamber 2 are sent to the recovery chamber 32b by the drains 32a, then toward the mixed part 34a.

The mixed part 34a is also connected to a bifurcation 33a, the mixed part 34a being located between this bifurcation 33a and the recovery chamber 32b.

The bifurcation 33a is arranged in order to separate the water and the air, that have passed into the mixed part 34a, originating from the pressing chamber 2.

In order to carry out such a separation of the air and the water, the bifurcation 33a preferably comprises a deaerator pot. Such a deaerator pot is for example of tray deaerator or spray deaerator type.

As illustrated in FIG. 1, the bifurcation 33a is connected, on the one hand, to the mixed part 34a and, on the other hand, to piping components 33b, 34b respectively connected to the air outlet 31 and to a water outlet 35.

The pipe 3 also comprises an air circulation branch in particular comprising the piping component 33b, and a water discharge branch in particular comprising the piping component 34b.

The air circulation branch comprises several piping components 33b, 33c, 33d connecting the bifurcation 33a and the air outlet 31.

Preferably, a valve 61 is mounted between the piping components 33b and 33c of the air circulation branch. The valve 61 is of a type suitable for preventing a circulation of air in the pipe 3 through this valve 61 when it is placed in a closed state X61, and suitable for allowing a circulation of air in the pipe 3 through this valve 61 when it is placed in an open state Y61.

When the valve 61 is in the open state Y61, air can circulate in the pipe 3 between the pressing chamber 2 and the air outlet 31 through the drains 32a, the recovery chamber 32b, the mixed part 34a, the bifurcation 33a and the piping components 33b, 33c, 33d of the air circulation branch of the pipe 3.

In particular, when the piston 22 is displaced in the first direction 11 (FIG. 1), the volume of the pressing chamber 2 decreases. A decrease in the volume of the pressing chamber 2 increases the pressure of the air present in the pressing chamber 2 resulting in a "natural" evacuation of air from the pressing chamber 2 through the pipe 3 to the air outlet 31.

Air introduction means 5 preferably comprising a non-return valve 51 are mounted on the air circulation branch of the pipe 3 upstream of the valve 61 on the pipe component 33b. Such a non-return valve 51 makes it possible to introduce air into the piping 33b through this valve 51 and to prevent the air leaving the pipe 3 through this valve 51. Preferably, the non-return valve 51 opens, at its branching part not connected to the air circulation branch of the pipe 3, into premises accommodating the piston press 1 (this premises being filled with ambient air), or into the environment of the piston press.

It advantageously results therefrom that when the piston 22 is displaced in the second direction 12 (FIG. 2), thus increasing the volume of the pressing chamber 2 and leading to a vacuum pressure that generates a draft, air originating from said premises is naturally sucked up by the non-return valve 51 and circulates to the pressing chamber 2 through the air circulation branch of the pipe 3.

In one very advantageous embodiment, an air injection system 7 is mounted on the pipe 3, preferably on the piping component 33b of the air circulation branch represented in FIG. 1.

This air injection system 7 preferably comprises a tank 71 in which compressed air is stored.

Preferably, the air injection system 7 is arranged in order to inject compressed air stored in the tank 71 into the pipe 3, and in particular into the piping 33b of the air circulation branch.

This air injection system 7 is preferably arranged in order to be able to inject a volume of compressed air into the pipe 3 over a relatively short duration, for example of less than 2 seconds, with a relatively high pressure, for example 6 bar.

In this way, when the valve 61 is placed in the closed state X61, the compressed air injected into the pipe 3 circulates in the air circulation branch and the drains 32a to the pressing chamber 2. Very advantageously, the pressure of the compressed air injected is determined in order to clean the drains 32a, for example due to the clogging thereof by their contact with the product to be dewatered present in the pressing chamber 2, or in order to apply pressure to this product to be dewatered that promotes the dewatering thereof.

In this use case, the non-return valve 51 is calibrated to withstand a pressure of 6 bar.

Preferably, the air circulation branch of the pipe 3 additionally comprises ventilation means, for example a fan 8 suitable for generating an airflow from the pressing chamber 2 to the air outlet 31 of the pipe 3, in particular when the valve 61 is placed in the open state Y61.

Regarding the water discharge branch of the pipe 3, a valve 62 is preferably mounted downstream of the bifurcation 33a on the piping component 34b of the water discharge branch. The valve 62 is of a type suitable for preventing a circulation of water in the pipe 3 through this valve 62 when it is placed in a closed state X62, and suitable for allowing a circulation of water in the pipe 3 through this valve 62 when it is placed in an open state Y62.

When the valve 62 is in the open state Y62, water can circulate in the pipe 3 between the pressing chamber 2 and the water outlet 35 through the drains 32a, the recovery chamber 32b, the mixed part 34a, the bifurcation 33a and the piping component 34b of the water discharge branch of the pipe 3.

Advantageously, the water discharge branch of the pipe 3 comprises, downstream of the valve 62, hydraulic means 4, for example a siphon, suitable for preventing a circulation of air in this branch through these hydraulic means 4.

Regarding the valves 61, 62 of the air circulation and water discharge branches respectively, the piston press 1 according to the invention preferably comprises control means 63 suitable for governing these valves 61, 62 during steps of opening or closing these valves. These steps are described in the following section.

Usage Process

FIG. 5 represents a preferred usage embodiment of the piston press 1 according to a combination of the features that have just been described in accordance with the press represented in FIG. 1.

The piston press 1 is preferably arranged in order to carry out the following operations so as to dewater a product to be dewatered, preferably wastewater sludge:

at least one filling and prepressing operation A1 consisting in introducing product to be dewatered into the pressing chamber 2 of the piston press 1, the filling being carried out when the piston 22 is displaced in the second direction 12, the prepressing being carried out when the piston 21 is displaced in the first direction 11;

at least one pressing operation A2 consisting in alternately displacing the piston 22 in the second direction 12, and in the first direction 11 in order to extract from the product to be dewatered a portion of the water that it contains;

at least one emptying operation A3 that consists in discharging the product to be dewatered, that has undergone at least one pressing operation A2, from the pressing chamber 2 through opening Y21 of the cylinder 21 (FIG. 4).

With reference to FIG. 5, the piston press 1 according to the invention carries out for example a dewatering cycle comprising at least one filling and pre-pressing operation A1 comprising the following steps:

a step X61, X62 of closing the valves 61, 62, then, a step of displacing the piston 22 in the second direction 12, so as to increase the volume of the pressing chamber 2, for example from the position of the piston 22 represented by dotted lines in FIG. 3 to the position of this piston 22 represented by dotted lines in FIG. 2, this step making it possible to fill, at least partially, the pressing chamber 2 with product to be dewatered through an orifice (not represented), this orifice being for example coaxial with the mixed part 34a and made in the end of the cylinder 211, while the valves 61, 62 are closed X61, X62, then, a step Y61, Y62 of opening the valves 61, 62, then, a step of displacing the piston 22 in the first direction 11, so as to decrease the volume of the pressing chamber 2, for example from the position of the piston 22 represented by dotted lines in FIG. 2 to the position of this piston 22 represented by dotted lines in FIG. 3, this step being carried out simultaneously with a step Y8 of generating an airflow by switching on the fan 8, while the valves 61, 62 are open Y61, Y62, then, a step X8 of interrupting the airflow by stopping the fan 8, then, if a condition C11 is met according to which the product to be dewatered contained in the pressing chamber 2 does not exceed a maximum filling volume of the pressing chamber 2, for example ⅔ of the volume of the pressing chamber 2, using for example measurement means such as flowmeter or concentration sensor, and if there is still product to be dewatered available for filling the pressing chamber 2, the filling and prepressing operation A1 is restarted at the step X61, X62 of closing the valves 61, 62 described above (see loop R1 in FIG. 5), if a condition C12 is met according to which the product to be dewatered contained in the pressing chamber reaches the maximum filling limit of the pressing chamber 2, or if there is no longer product to be dewatered available for filling the pressing chamber 2, at least one pressing operation A2 is carried out that comprises the following steps:

a step X61, X62 of closing the valves 61, 62, then, a step of displacing the piston 22 in the second direction 12, while the valves 61, 62 are closed X61, X62, then, a step Y7 of injecting a volume of compressed air into the pipe 3 by opening a valve of the injection system 7, the opening of this valve releasing compressed air contained in the tank 71 and possibly being governed by the control means 63 or by other control means, the compressed air thus released circulating to the pressing chamber 2, the volume of compressed air thus released being calculated as a function of an estimated volume of the product to be dewatered that is in the pressing chamber 2 and of a dewatering percentage of this product estimated from the volume of filtrate discharged or from the position of the piston 22, the compressed air thus injected making it possible to clean the drains 32a and to increase the final dryness of the product to be dewatered by applying a pressure to this product, while the valves 61, 62 are closed X61, X62, then, a step Y61, Y62 of opening the valves 61, 62, then, a step of displacing the piston 22 in the first direction 11, while the valves 61, 62 are open Y61, Y62, this step being carried out at the same time as a step Y8 of generating an airflow by switching on the fan 8, then, a step X8 of interrupting the airflow by stopping the fan 8, then.

The at least one pressing operation A2 may be repeated several times, as represented by the loop R2 (FIG. 5).

Preferably, after the at least one pressing operation A2 and before the at least one emptying operation A3, a step Y7 of injecting a volume of compressed air into the pipe 3 is carried out, for example by opening a valve of the injection system 7, after having closed X61, X62 the valves 61, 62.

The at least one emptying operation A3 preferably comprises the following steps:

a step Y61 of opening the valve 61, then, a step Y21 of opening the cylinder 21 (FIG. 4) making it possible to discharge, from the pressing chamber 2, product to be dewatered that the latter contains, this step being carried out simultaneously with a step Y8* of generating an airflow by switching on the fan 8, the flow rate of the fan 8 preferably being maximum in order to suck up a maximum amount of contaminated air (bought into contact with product to be dewatered in the pressing chamber 2), while the valve 61 is open Y61, then if a condition C21 is met according to which the opening of the cylinder 21 is not maximum, for example if the time elapsed since the initiation of the preceding opening step is less than an estimated time for maximum opening of the cylinder 21 (for example via an end of travel detector), it is necessary to wait until a condition C22 is met (see loop R3 in FIG. 5), if the condition C22 is met according to which the opening of the cylinder 21 is maximum, for example if said time elapsed reaches said estimated time for maximum opening of the cylinder 21, the operation moves on to the next step:

a step X21 of closing the cylinder 21, then, a step X61 of closing the valve 61, this step being carried out at the same time as a step X8 of interrupting the airflow by stopping the fan 8, then, if a condition C31 is met according to which the at least one emptying operation A3 has been carried out only once, an emptying operation A3 is repeated by making the injection step Y7 precede it (see loop R4 in FIG. 5), if a condition C32 is met according to which the at least one emptying operation A3 has been carried out more than once, the at least one emptying operation A3 is terminated.

During the at least one filling and prepressing operation A1 and during the at least one pressing operation A2, the cylinder 21 is closed X21.

A washing operation may be carried out by carrying out the at least one filling and pre-pressing operation A1, pressing operation A2, and emptying operation A3, and replacing the product to be dewatered with washing water.

Of course, the invention is not limited to the examples that have just been described and many adjustments may be made to these examples without departing from the scope of the invention. Furthermore, the various features, forms, variants and embodiments of the invention may be combined with one another according to various combinations insofar as they are not mutually incompatible or exclusive.

The invention claimed is:

1. A piston press (1), comprising:
    a pressing chamber (2), formed by a cylinder (21) and a piston (22), the pressing chamber (2) also including drains (32a) connecting the piston (22) and a first end of the cylinder (211), and a recovery chamber (32b) located in the first end of the cylinder (211) and connected to a mixed part pipe element (34a), the drains (32a) being impermeable to solid materials and permeable to liquids and gases;
    a pipe (3) connecting the pressing chamber (2) to an air outlet (31); and
    closure means (61, 62) for reversibly closing the pipe (3) to reversibly prevent any circulation of air or water in the pipe (3),
    said piston press (1) being arranged in order to carry out at least one pressing operation (A2), comprising:
        at least one first displacement of the piston in a first direction (11) that reduces the volume of the pressing chamber (2), and
        at least one second displacement of the piston in a second direction (12) that increases the volume of the pressing chamber (2),
    said pipe (3) being arranged so that air circulating in the pipe (3) between the pressing chamber (2) and said air outlet (31) is displaced:
        from the pressing chamber (2) to the air outlet (31) of the pipe (3) when the piston (22) is displaced in the first direction (11), and
        to the pressing chamber (2) when the piston (22) is displaced in the second direction (12),
    the pipe (3) comprising:
        a mixed part (34a) arranged to move air and water originating from the pressing chamber (2), and
        a bifurcation (33a) arranged in order to separate the air and the water moved through the mixed part (34a),
    the mixed part (34a) of the pipe (3) connected to the recovery chamber and located between the bifurcation (33a) and the pressing chamber (2).

2. The piston press (1) as claimed in claim 1, wherein the pipe (3) further comprises:
    an air circulation branch (33b, 33c, 33d) connecting the bifurcation (33a) and the air outlet (31), and
    a water discharge branch (34b) connecting the bifurcation (33a) and a water outlet (35) of said this water discharge branch (34b).

3. The piston press (1) as claimed in claim 2, further comprising:
    hydraulic means (4) that prevent circulation of air in the water discharge branch (34b).

4. The piston press (1) as claimed in claim 1, further comprising:

air introduction means (5) that introduce, into the pipe (3), air originating from outside the pressing chamber (2).

5. The piston press (1) as claimed in claim 4, wherein the air introduction means (5) comprise a non-return valve (51).

6. The piston press (1) as claimed in claim 1, further comprising:
   control means (63) that govern the closure means (61, 62) of the pipe (3).

7. The piston press (1) as claimed in claim 1, further comprising:
   ventilation means (8) that generate an airflow from the pressing chamber (2) to the air outlet (31) of the pipe (3).

8. The piston press (1) as claimed claim 1, wherein the bifurcation (33a) discharges the water by effect of gravity on the water so as to separate the water and the air.

9. The piston press (1) as claimed in claim 1, further comprising:
   an air injection system (7) comprising a compressed air tank (71), said injection system (7) configured to inject a volume of compressed air into the pipe (3) toward the pressing chamber (2).

10. A process for using a piston press (1) as claimed in claim 1, the piston press (1) carrying out at least one pressing operation (A2), the process comprising:
    a circulating air in the pipe (3) between the pressing chamber (2) and the air outlet (31), during which the air is displaced:
       from the pressing chamber (2) to the air outlet (31) of the pipe (3) when the piston (22) is displaced in the first direction (11), and
       to the pressing chamber (2) when the piston (22) is displaced in the second direction (12);
    a step of circulating air and water originating from the pressing chamber (2) to the recovery chamber (32b) via the drains (32a), then toward the mixed part (34a) of the pipe (3);
    a step of separating the air and the water moved through the mixed part (34a); and
    a step (X61, X62) of closing the pipe (3), preventing any circulation of air or water in the pipe (3) through the closure means (61, 62) of the piston press (1).

11. The process as claimed in claim 10, further comprising:
    a step of introducing, into the pipe (3), air originating from outside the pressing chamber (2).

12. The usage process as claimed in claim 10, further comprising:
    a step (Y7) of injecting a volume of compressed air into the pipe (3) toward the pressing chamber (2).

13. The process as claimed in claim 12, wherein the calibrated volume of compressed air is calculated as a function of an estimated volume of a product to be dewatered that is in the pressing chamber (2) and of a set dewatering percentage of said product to be dewatered.

14. The process as claimed in claim 12, wherein the step (Y7) of injecting comprises an injection step carried out after the at least one pressing operation (A2) takes place, and that precedes an emptying operation (A3), the emptying operation (A3) making it possible to discharge from the pressing chamber (2) a product to be dewatered that has undergone the at least one pressing operation (A2).

15. The process as claimed in claim 12, wherein the step (Y7) of injecting comprises an injection step carried out before completion of the at least one pressing operation (A2).

16. The process as claimed in claim 12, wherein the step (X61, X62) of closing the pipe is carried out before the step (Y7) of injecting.

17. The process as claimed in claim 10, further comprising:
    a step (Y8, Y8*) of generating airflow that displaces air in the pipe (3) from the pressing chamber (2) to the air outlet (31).

18. The process as claimed in claim 17, wherein the step of generating airflow comprises a step (Y8) of generating an airflow produced while the piston (22) is displaced in the first direction (11).

19. The process as claimed in claim 17, wherein the step of generating airflow comprises a step (Y8*) of generating an airflow produced during an emptying operation (A3), the emptying operation (A3) making it possible to discharge, from the pressing chamber (2), a product to be dewatered that has undergone the at least one pressing operation (A2).

20. The process as claimed in claim 17,
    wherein the piston press further comprises an air injection system (7) with a compressed air tank (71), said injection system (7) configured to inject a volume of compressed air into the pipe (3) toward the pressing chamber (2), and
    wherein the flow of air is transported by the ventilation means (8) from the piston press (1) and is controlled so as to achieve a flow calculated as a function of an estimated dewatering percentage of a product to be dewatered that is in the pressing chamber (2).

* * * * *